(12) United States Patent
Kim et al.

(10) Patent No.: US 7,188,090 B2
(45) Date of Patent: Mar. 6, 2007

(54) DRILL-THROUGH QUERIES FROM DATA MINING MODEL CONTENT

(75) Inventors: Pyungchul Kim, Sammamish, WA (US); C. James MacLennan, Redmond, WA (US); Zhaohui Tang, Bellevue, WA (US); Raman Iyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 10/611,119

(22) Filed: Jun. 30, 2003

(65) Prior Publication Data

US 2005/0021482 A1 Jan. 27, 2005

(51) Int. Cl.
*G06F 17/00* (2006.01)
*G06F 17/20* (2006.01)

(52) U.S. Cl. .................. 706/11; 706/14; 706/46
(58) Field of Classification Search .............. 706/11, 706/14, 46; 704/4
See application file for complete search history.

(56) References Cited

U.S. PATENT DOCUMENTS

| | | | |
|---|---|---|---|
| 2003/0233224 A1* | 12/2003 | Marchisio et al. | 704/4 |
| 2004/0075692 A1* | 4/2004 | Matichuk | 345/806 |
| 2004/0078373 A1* | 4/2004 | Ghoneimy et al. | 707/10 |
| 2004/0205638 A1* | 10/2004 | Thomas et al. | 715/526 |
| 2004/0236620 A1* | 11/2004 | Chauhan et al. | 705/9 |
| 2004/0267760 A1* | 12/2004 | Brundage et al. | 707/100 |
| 2006/0074858 A1* | 4/2006 | Etzold et al. | 707/3 |

FOREIGN PATENT DOCUMENTS

WO   WO 01/37120 A2   5/2001

OTHER PUBLICATIONS

Thearling, K. et al., "Visualizing Data Mining Models", *Information Visualization in Data Mining and Knowledge Discovery*, 2001, http://www.thearling.com/text/dmviz/modelviz.htm, 14 pages.
Priss, U., "Lattice-based information retrieval," 2000, http://www.upriss.org.uk/papers/ko00.pdf, downloaded from the Internet on May 9, 2006, 1-15.
Priss, U., "Lattice-based information retrieval," *Knowledge Organization*, 2000, 27(3), 132-142.
Stumme, G., et al., "Conceptual knowledge discovery in databases using formal concept analysis methods," *Second European Symposium, PKDD '98 Nantes, France* 1998, 450-458.

* cited by examiner

*Primary Examiner*—Joseph P Hirl
(74) *Attorney, Agent, or Firm*—Woodcock Washburn LLP

(57) ABSTRACT

A drill-through feature is provided which provides a universal drill-through to mining model source data from a trained mining model. In order for a user or application to obtain model content information on a given node of a model, a universal function is provided whereby the user specifies the node for a model and data set, and the cases underlying that node for that model and data set are returned. A sampling of underlying cases may be provided, where only a sampling of the cases represented in the node is requested.

51 Claims, 5 Drawing Sheets

400

| Drill.Through | | | | | | | | | |
|---|---|---|---|---|---|---|---|---|---|
| Cases Classified to: | | | | | | | | | |
| Maritalstatus = Married-civ-spouse and Capitalgain < 5999.940 and Educationnum >= 10.130 | | | | | | | | | |
| Age | Capitalgain | Capitalloss | Education | Educationnum | Hoursperweek | ID | Income | Marita |
| 28 | 0 | 0 | Assoc-acdm | 12 | 40 | 3 | >50K | Married |
| 63 | 3103 | 0 | Prof-school | 15 | 32 | 8 | >50K | Married |
| 36 | 0 | 0 | Bachelors | 13 | 40 | 12 | <=50K | Married |
| 43 | 0 | 0 | Masters | 14 | 50 | 16 | >50K | Married |
| 40 | 0 | 0 | Doctorate | 16 | 45 | 20 | >50K | Married |
| 34 | 0 | 0 | Bachelors | 13 | 47 | 21 | >50K | Married |
| 25 | 0 | 0 | Bachelors | 13 | 40 | 25 | <=50K | Married |
| 36 | 0 | 0 | Bachelors | 13 | 40 | 37 | >50K | Married |
| 65 | 0 | 0 | Masters | 14 | 50 | 41 | >50K | Married |
| 44 | 0 | 0 | Assoc-voc | 11 | 45 | 42 | >50K | Married |
| 28 | 0 | 0 | Assoc-voc | 11 | 36 | 46 | >50K | Married |
| 34 | 3103 | 0 | Bachelors | 13 | 50 | 58 | >50K | Married |
| 46 | 0 | 0 | Assoc-voc | 11 | 40 | 72 | <=50K | Married |
| 33 | 5178 | 0 | Masters | 14 | 10 | 93 | >50K | Married |
| 29 | 0 | 0 | Assoc-voc | 11 | 40 | 113 | >50K | Married |
| 48 | 0 | 0 | Doctorate | 16 | 40 | 127 | >50K | Married |
| 41 | 0 | 2415 | Masters | 14 | 50 | 130 | >50K | Married |
| 42 | 0 | 0 | Doctorate | 16 | 41 | 134 | >50K | Married |
| Query execution completed with 146 rows fetched | | | | | | | | | |

FIG. 4

DRILL-THROUGH QUERIES FROM DATA MINING MODEL CONTENT

FIELD OF THE INVENTION

This invention relates in general to the field of data mining. More particularly, this invention relates to a drill-through feature providing source data from a computed model.

BACKGROUND OF THE INVENTION

Data mining is the exploration and analysis of large quantities of data, in order to discover correlations, patterns, and trends in the data. Data mining may also be used to create models that can be used to predict future data or classify existing data.

For example, a business may amass a large collection of information about its customers. This information may include purchasing information and any other information available to the business about the customer. The predictions of a model associated with customer data may be used, for example, to control customer attrition, to perform credit-risk management, to detect fraud, or to make decisions on marketing.

Intelligent cross-selling support may be provided. For example, the data mining functionality may be used to suggest items that a user might be interested in by correlating properties about the user, or items the user has ordered, with a database of items that other users have ordered previously. Users may be segmented based on their behavior or profile. Data mining allows the analysis of segment models to discover the characteristics that partition users into population segments. Additionally, missing values in user profile data may be predicted. For example, where a user did not supply data, the value for that data may be predicted To create and test a data mining model, available data may be divided into two parts. One part, the training data set, may be used to create models. The rest of the data, the testing data set, may be used to test the model, and thereby determine the accuracy of the model in making predictions. Once a data mining model has been created, it may be used to make predictions regarding data in other data sets.

Data within data sets is grouped into cases. For example, with customer data, each case may correspond to a different customer. Data in a case describes or is otherwise associated with one customer. One type of data that may be associated with a case (for example, with a given customer) is a categorical variable. A categorical variable categorizes the case into one of several pre-defined states. For example, one such variable may correspond to the educational level of a customer. In one example, there are various possible values for this variable. The possible values are known as states. For instance, the states of a marital status variable may be "married" or "unmarried" and may correspond to the marital state for the customer. Another kind of variable is a continuous variable. A continuous variable is one with a range of possible values. For example, one such variable may correspond to the age of a customer. Associated with the age variable is a range of possible values for the variable.

As mentioned, available data is partitioned into two groups—a training data set and a testing data set. Often 70% of the data is used for training and 30% for testing. A model may be trained on the training data set, which includes this information. Once a model is trained, it may be run on the testing data set for evaluation. During this testing, the model will be given all of the data except the age data, and asked to predict the customer's age given the other data. After training and evaluation, the model may be used on other data sets.

Running the model on the testing data set, the results produced by the model are compared to the actual testing data to see how successful the model was at correctly predicting the age of the customer.

When the model has been run, a graphical representation of the model as applied to the data set may be produced. FIG. 1 is an example a model of a decision tree graph displaying the result of applying a data mining model to a data set. The graph displays the results of applying a data mining model in order to predict the ages for a specific group of cases from the data set. Each case in the model exists in one or more nodes of the graph. For example, the root node 1142 of the graph is labeled "all" and contains all of the cases in the graph. Nodes can be described in terms of "levels" where the leaves with the longest path from root to leaf are level zero nodes in the decision tree, and the parent of a level n node is a level n+1 node. With this terminology, root node 1142 is a level four node.

One level below the root node 1142 are level three nodes 1132 and 1134. The cases are divided among these nodes based on the marital status in each case. The groups of cases represented by the nodes are further subdivided based on a value for a "Capitalgain" variable into four level two nodes 1122, 1124, 1126, and 1128. A further divisions is made to the cases represented in level two node 1122 based on an "Educationnum" variable into level one nodes 1112 and 1113. A further division is made to the cases represented in level two node 1126 based on the "Educationnum" variable into two level one nodes 1114 and 1116. And a further division is made to the cases represented in level two node 1128 based on a "Hoursperweek" variable into two level one nodes 1118, and 1119. Cases in the level one nodes 1114 and 1116 are further divided on the basis of an age variable into level zero nodes 1102 and 1104 (for level one node 1114) and into level zero nodes 1106 and 1108 (for level one node 1116).

This graph presents a visual representation of the application of a mining model to a data set. Other graphs, such as cluster maps, also present such visual representations of the application for a mining model to a data set. In some graphical displays, each node includes an informational bar or other display which contains information regarding the cases contained in the node.

While this information may be useful, there may be a need to find more information regarding the cases contained in the node. Some programs which implement the graphing of the results of the application of a data mining model to a data set allow a user to access data from a node. Such existing solutions are proprietary to the data mining program being used and are closed. No extension or generality is present for such access. The functionality is tied to the tool being used to generate and display the graph. However, providing a user with the ability to use a broad range of applications to store data sets, apply data mining models, and display data mining graphs is desirable, in order to provide flexibility to the user. Thus, there is a need for the ability to implement access of data from a data set corresponding to data graphically displayed for a data mining model as applied to the data set, regardless of the application being used to store data sets, apply data mining models, and display data mining graphs.

SUMMARY OF THE INVENTION

A graphical representation may be made of a mining model applied to a data set. A request for data underlying a specified node from among said at least one node is detected. A determination is made of which cases in the data set underlie that node. Data regarding the underlying cases is provided. All data regarding the underlying cases may be provided, or, where requested, a sampling of data regarding the underlying cases is provided.

Other embodiments are described below.

BRIEF DESCRIPTION OF THE DRAWINGS

The foregoing summary, as well as the following detailed description of presently preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 is an example of drill-through data displayed in a window; and

DETAILED DESCRIPTION OF ILLUSTRATIVE EMBODIMENTS

Overview

A drill-through feature is provided which provides a universal drill-through to mining model source data from a trained mining model. In order for a user or application to obtain model content information on a given node of a model, in one embodiment a universal function is provided whereby the user specifies the node for a model and data set, and the cases in that node for that model and data set are returned.

Exemplary Computing Environment

Figure 2:
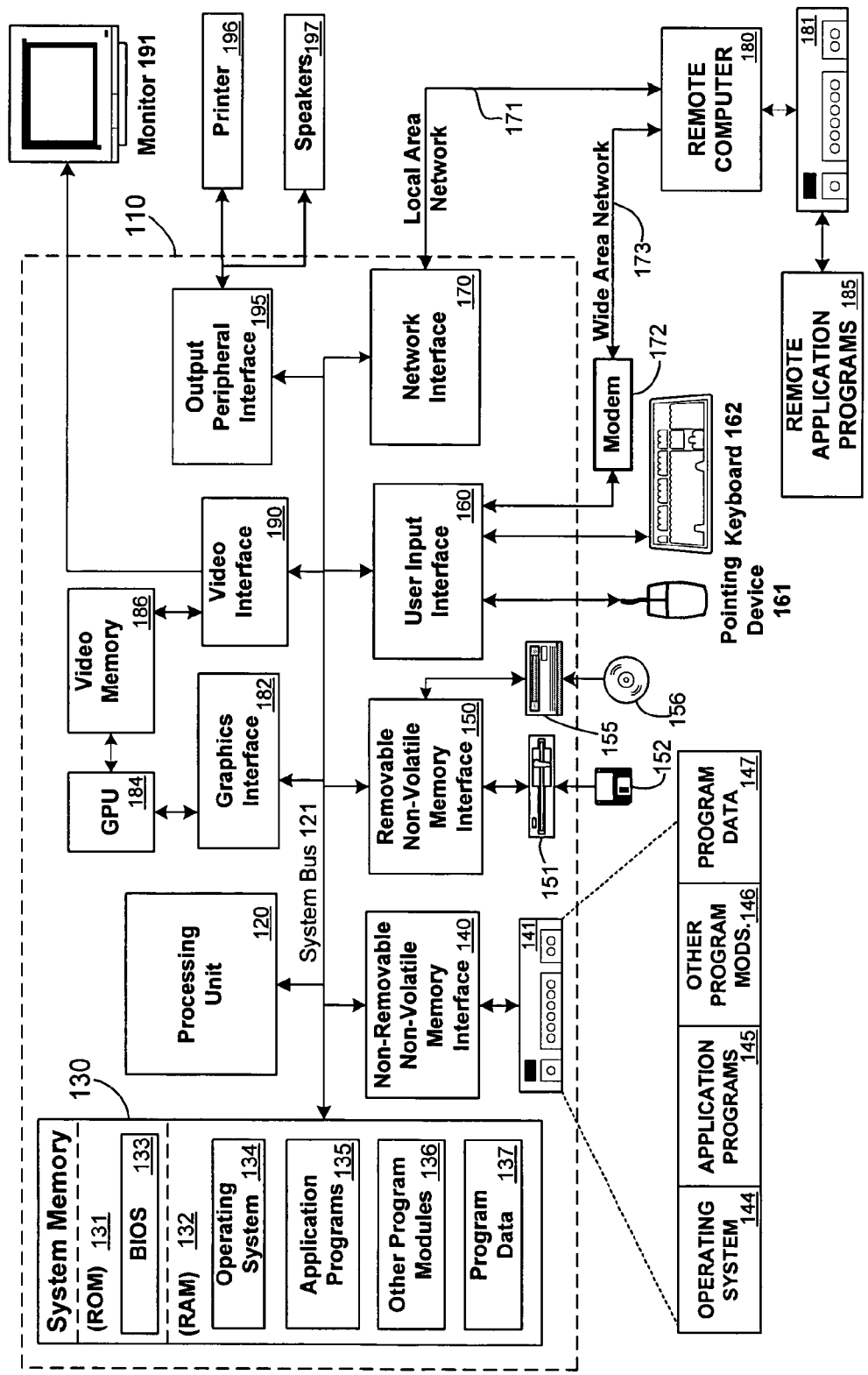
FIG. 2 is a block diagram of an exemplary computing environment in which aspects of the invention may be implemented.

FIG. 2 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

While some exemplary embodiments herein are described in connection with software residing on a computing device, one or more portions of the invention may also be implemented via an operating system, application programming interface (API) or a "middle man" object, a control object, hardware, firmware, etc., such that the methods may be included in, supported in or accessed via all of NET's languages and services, and in other distributed computing frameworks as well.

Drill-Through Functionality

As discussed, data mining applications allow for the training and use of models on data sets. Generally, data sets can be represented as tables of data. Each case is represented by a row of the table, and each column of the table corresponds to a variable. The value in a cell indexed by row R and column C corresponds to the value for the variable corresponding to column C for the case corresponding to row R. While data sets can be represented as tables of data and are often stored in table structures, other data set storage and representations are contemplated.

Figure 1:
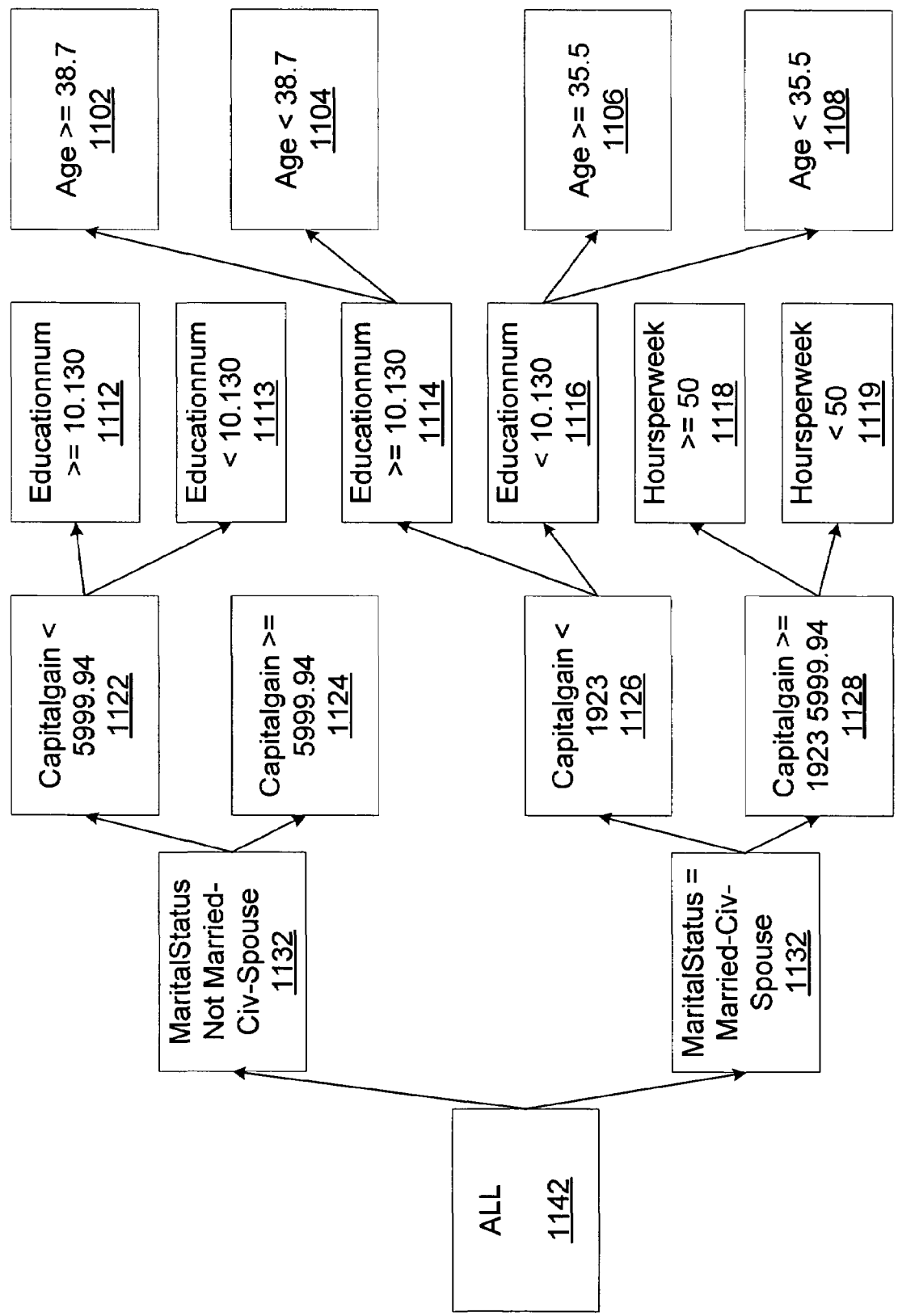
FIG. 1 is a block diagram of a graphical representation of a mining model applied to a data set.

When a mining model is applied to a data set, the result is a graphical representation of the data. The graphical representation includes nodes. The nodes of the graphical representation are populated by the cases from the data set. The application which applies the mining model to the data set, takes data from the data set and uses it to populate the graphical representation of the mining model applied to the data set. However, certain information may be lost in the graphical representation. For example, in a graphical representation of a mining model applied to a data set, the nodes may be shaded based on the number of cases at the node. All cases in the data set are shown at the root node. That node will be shaded correspondingly. The cases are split in the next level, and the shading in that level will indicate which node has more data and which has less. However, even in such a shaded representation, although the shading may indicate how many cases fall into each node, other information from the data set is lost. For example, the data set may contain an "Income" variable. This variable is not used in dividing the cases among the nodes in the graphical representation in FIG. 1. There are many reasons a variable may not be used in a graphical representation. For example, a user may expressly request that a specific variable not be included in the use or creation of a mining model. In other cases, a mining model may be developed which does not use a specific variable because it does not positively effect the model's predictive ability. However, there may be a need for a user to see the values for the specific variable.

Figure 3:
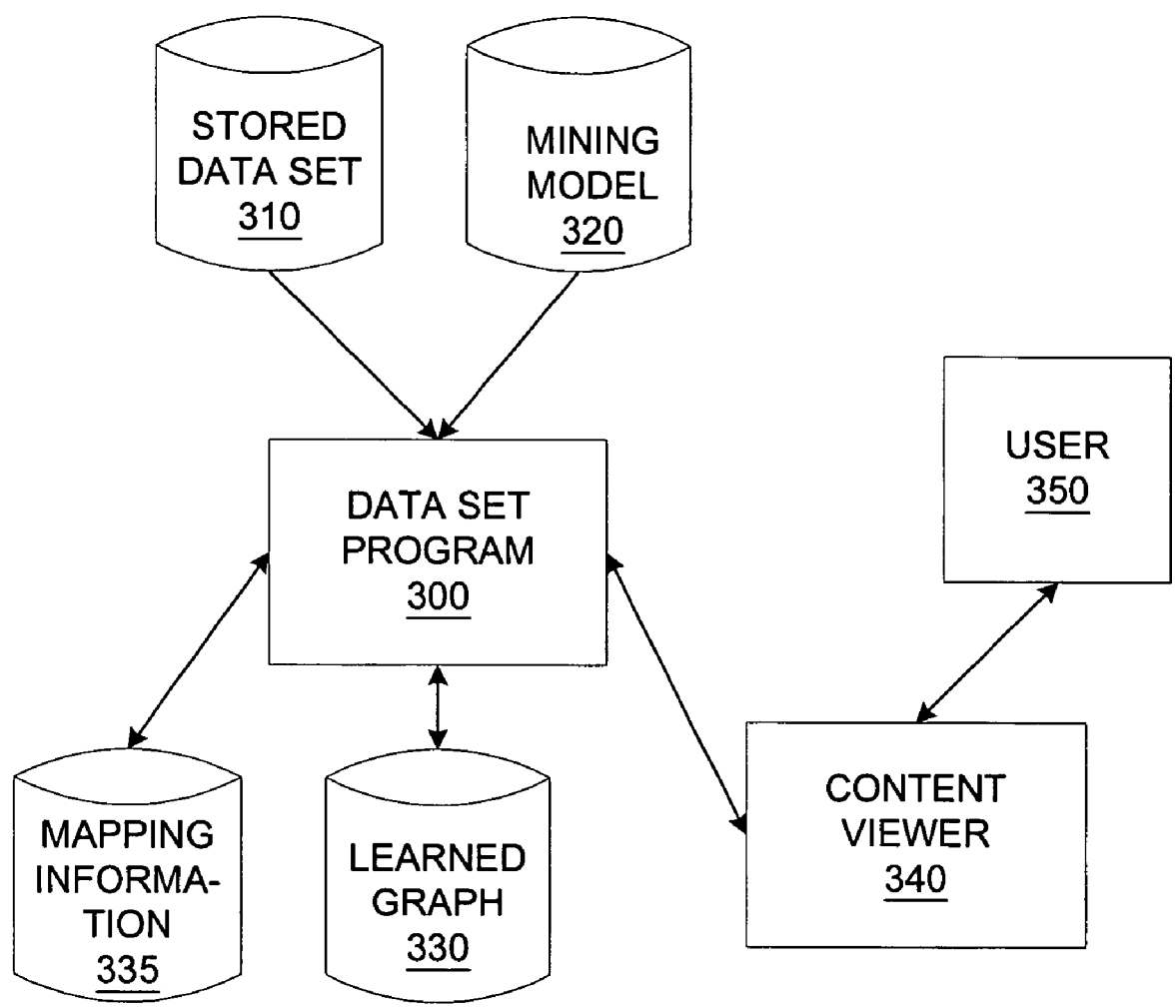
FIG. 3 is a block diagram of a system according to the present invention.

As shown in FIG. 3, the data set program 300 provides access to the stored data set 310. Access to the data set may be provided via a query language. For example, where the data set storage program 300 is one of the SQL applications available from Microsoft, Inc., the query language is the SQL query language. Other database applications may include mining model or related functionality, and the use of the invention with such other applications is also contemplated.

Mining models 320 are also stored in one embodiment of the invention. In addition, in one embodiment, the application of a mining model 320 to a data set 310 produces a learned graph 330. These learned graphs 330 may be stored and can be used by a user 350 through a content viewer 340. The content viewer may be a separate application, as shown in FIG. 3, or may be integrated into the data set program 300. Content viewer 340 provides access to graphical representations such as the example graphical representation in FIG. 1 which are based on learned graph 330 information. In addition to a decision tree such as the one in FIG. 1, graphical representations may also include cluster displays, among other graphical representations.

User 350 of content viewer 340 may be either a human user interacting directly or indirectly with a user interface of content viewer 340. User 350 may also be another application or tool which uses the content viewer 340. According to one embodiment of the present invention, user 350 may request a display of data from the data set corresponding to the cases in a specific node. This data is termed "drill-through" data. For example, a human user viewing data on content viewer 340 may wish to view the underlying data at a specific node to determine other features of the cases in the node. The content viewer 340 may receive the user 350's request via a mouse click on a node, for example. In order to provide the data, the content viewer 340 requests the case data from data set program 300. According to one embodiment of the invention, a non-human user may request the case data from the data set program 300 as well. This is done, in one embodiment, by using an automated query.

In one embodiment, the content viewer 340 requests the case data for a specified node from data set program 300 via a query. For example, in one embodiment of the invention, a SQL-style syntax is adopted for this purpose. For example, in one embodiment, the query for cases from the model "model-one" for a given node "NodeSelected" may be:

Select * from [model-one].cases

Where IsInNode('NodeSelected')

This syntax indicates to the data set program 300 that it should return cases which are in the node "NodeSelected" in the model "model-one". In one embodiment, the cases returned when ".cases" is in the query are the training cases for the model which the model was trained on.

Because a large number of cases may be selected with a request, it may be useful for only a sample of such cases to be returned from the data set program 300. This allows the request for the underlying data to return a sample of the underlying data instead of all of the underlying data. This may provide advantages in data transfer cost. In such cases, rather than a request for data from all the cases in the model ("from [model-one].cases" in the example) a request may be made to provide only a subset of the cases in the model at the selected node. The subset comprises sample cases representative of the data at the node. For example, in one embodiment, the syntax for the request may be made:

Select * from [model-one].sample_cases

Where IsInNode("NodeSelected")

The data set program 300 interprets this request and provides a sampling of the data underlying NodeSelected.

In another embodiment, when a sampling of cases are requested, instead of actual cases at the node, hypothetical cases may be returned. Because the request for a sample of cases is done in order to explain the contents of the node, one way to add clarity is to provide a hypothetical case which explains the contents of the node being queried. In some cases, actual data may be less clear than hypothetical cases. While such hypothetical cases may not have been part of the training data for the model, hypothetical cases are returned would have been in the node had they been part of the training cases. Hypothetical cases may have been previously generated or provided so that appropriate hypothetical cases may be found when a request for hypothetical cases is made. In such a case, in addition to the information shown as being stored and available to the data set program 300 in FIG. 3, hypothetical case information will be available to the data set program 300. Alternately, hypothetical cases may be generated on-the-fly, when the request is made.

As shown in FIG. 3, in one embodiment, in addition to storing learned graph 330 information, the data set program also stores mapping information 335. This mapping information stores the information regarding the mapping of cases into a node in one of the learned graphs 330. In this way, even if the model for the learned graph is not accessible, the case information for a learned graph may be returned upon a query.

FIG. 4 displays an example of drill-through data. This data corresponds to a drill-through of node 1112 in FIG. 1. As shown, case information for the node is displayed in a window 400, including data for variables not displayed in the decision tree of FIG. 1.

Figure 5:
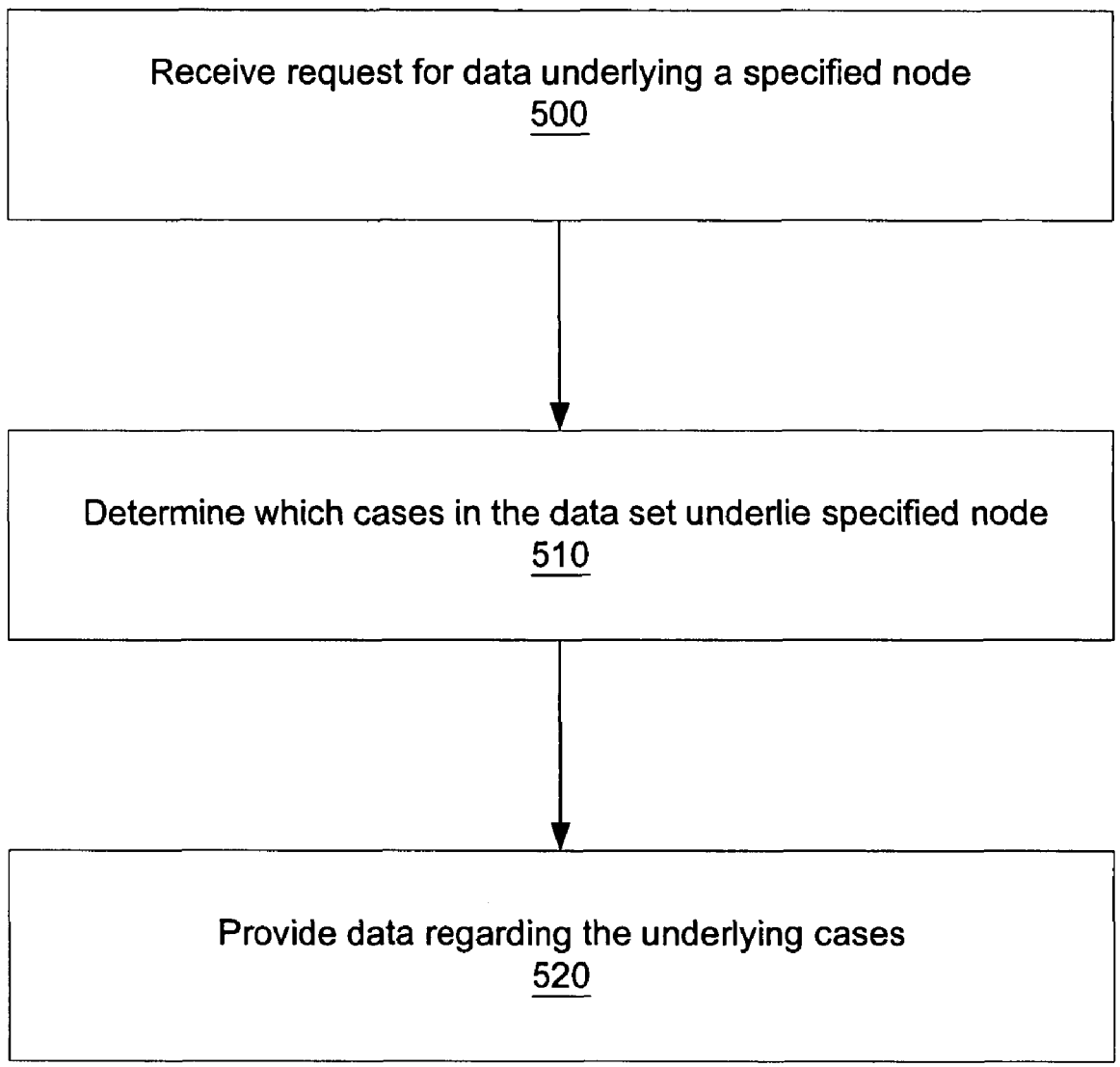
FIG. 5 is a flow diagram of a method of providing drill-through information from a graphical representation according to one embodiment of the invention.

A method according to one embodiment of the invention is shown in the flow chart of FIG. 5. A request for data underlying a specified node from among said at least one node is received in step 500. A determination is made of which cases in the data set underlie that node in step 510. Data regarding the underlying cases is provided in step 520.

All data regarding the underlying cases may be provided, or, where requested, a sampling of data regarding the underlying cases is provided.

While the present invention has been described with reference to relational data sources, the applicability of the invention described is not limited to such data sources. For example, and without limitation, it is contemplated that the present invention can be practiced in a context where the data source is multidimensional, such as a on-line analytical processing (OLAP) cube source, or of any other mining model data type.

There are multiple ways of implementing the present invention, e.g., an appropriate API, tool kit, driver code, operating system, control, standalone or downloadable software object, etc. which enables applications and services to use the product configuration methods of the invention. The invention contemplates the use of the invention from the standpoint of an API (or other software object), as well as from a software or hardware object that communicates in connection with product configuration data. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to implement product configuration. Thus, the techniques for encoding/decoding data in accordance with the present invention may be applied to a variety of applications and devices. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. With respect to embodiments referring to the use of a control for achieving the invention, the invention is not limited to the provision of a .NET control, but rather should be thought of in the broader context of any piece of software (and/ore hardware) that achieves the configuration objectives in accordance with the invention. One of ordinary skill in the art will appreciate that there are numerous ways of providing object code and nomenclature that achieves the same, similar or equivalent functionality achieved by the various embodiments of the invention. The term "product" as utilized herein refers to products and/or services, and/or anything else that can be offered for sale via an Internet catalog. The invention may be implemented in connection with an on-line auction or bidding site as well.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the product configuration techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for providing information regarding a graphical representation of a mining model applied to a data set, said data set comprising at least one case, said graphical representation comprising at least one node corresponding to at least one of said at least one case, said method comprising:

receiving a request for data underlying a specified node from among said at least one node;

determining which of said at least one case corresponds to said specified node; and providing data regarding said corresponding cases, the data being absent from the graphical representation of the mining model.

2. The method of claim 1, where said receiving includes detecting a request for data underlying a specified node, said detecting comprising:

receiving a query having query information associated therewith; and detecting that said query information comprises said request for data underlying a specified node.

3. The method of claim 2, where said receiving a query comprises receiving a query in a specific query language.

4. The method of claim 3, wherein said receiving a query includes receiving a query in SQL database query language.

5. The method of claim 1, where said providing data regarding said corresponding cases comprises providing data regarding each of said corresponding cases.

6. The method of claim 1, where said receiving a request comprises receiving a request for a sample of data, and where said providing data regarding said corresponding cases comprises providing data regarding a sampling of said corresponding cases.

7. A computer readable medium comprising computer executable modules having computer executable instructions for performing the method of claim 1.

8. A computer readable medium comprising computer executable modules having computer executable instructions, said modules for providing information regarding a graphical representation of a mining model applied to a data set, said data set comprising at least one case, said graphical representation comprising at least one node corresponding to at least one of said at least one case, said computer executable modules comprising:

an input component for receiving an indication of a node from among said at least one node;

an analysis component for determining which of said at least one case corresponds to said specified node; and an output component that outputs data regarding said corresponding cases the data being absent from the graphical representation of the mining model.

9. The computer readable medium of claim 8, where said input component detects a request for data underlying a specified node.

10. The computer readable medium of claim 9, where said input component receives a query and detects that said query includes said request for data underlying a specified node.

11. The computer readable medium of claim 10, where said input component receives a query a query in a specific query language.

12. The computer readable medium of claim 11, wherein said input component receives a query in SQL database query language.

13. The computer readable medium of claim 8, where said output component provides data regarding each of said corresponding cases.

14. The computer readable medium of claim 8, where said input component receives a request for a sample of data, and said output component outputs data regarding a sampling of said corresponding cases.

15. An application programming interface for use in connection with providing information regarding a graphical representation of a mining model applied to a data set, said data set comprising at least one case, said graphical representation comprising at least one node corresponding to at least one of said at least one case, wherein said application programming interface receives as input a request for data underlying a specified node from among said at least one node, sends a query to a database comprising said data to retrieve which of said at least one case corresponds to said specified node and outputs data regarding said corresponding cases, the data being absent from the graphical representation of the mining model.

16. The application programming interface of claim 15, where said application programming interface detects a request for data underlying a specified node by receiving a query and detecting that said query comprises said request for data underlying a specified node.

17. The application programming interface of claim 16, where said application programming interface sends a query to the database in a specific query language.

18. The application programming interface of claim 17, wherein said application programming interface sends a query in SQL database query language.

19. The application programming interface of claim 15, where said application programming interface outputs data regarding each of said corresponding cases.

20. The application programming interface of claim 15, wherein when said application programming interface receives a request for a sample of data, said application programming interface outputs data regarding a sampling of said corresponding cases.

21. The application programming interface of claim 20, wherein said application programming interface one of (a) formats the query the application programming interface sends to the database to retrieve a sampling and (b) samples full results of a standard query for all of the corresponding cases.

22. The application programming interface of claim 15, wherein said query is sent and said results are retrieved via at least one network.

23. A user interface exposing a universal function enabling a user to specify a node, via the user interface, from a graphical representation of a mining model applied to a data set, said data set comprising at least one case, said graphical representation comprising at least one node corresponding to at least one of said at least one case and in response to said user specifying the node, the cases underlying that node for that model and data set are retrieved and displayed to the user, including data that is absent from the graphical representation of the mining model.

24. The user interface of claim 23, where said user interface detects a request for data underlying the specified node, and in response sends a request for data underlying a specified node via an application programming interface.

25. The user interface of claim 24, where said application programming interface sends a query to the database in a specific query language.

26. The user interface of claim 25, wherein said application programming interface sends a query in SQL database query language.

27. The user interface of claim 23, where said user interface displays data regarding each of said corresponding cases.

28. The user interface of claim 24, wherein when said user interface receives a request for a sample of data relating to the specified node, said user interface sends to the application programming interface a request for data regarding a sampling of said corresponding cases.

29. The user interface of claim 28, wherein said user interface displays a sampling of the corresponding cases.

30. A system for providing information regarding a graphical representation of a mining model applied to a data set comprising at least one case, said system comprising:

an application programming interface, said application programming interface (a) receiving as input a request for data underlying a specified node from a graphical representation of a mining model applied to said data set, said graphical representation comprising at least one node corresponding to at least one of said at least one case, (b) sending a query comprising said data to retrieve, from among said at least one case, one or more corresponding cases which correspond to said specified node, and (c) responding to said request with data regarding said corresponding cases, the data being absent from the graphical representation of the mining model; and a database for storing said data set, operably connected with said application programming interface, and for receiving said query and returning said data regarding said corresponding cases to said application programming interface.

31. The system of claim 30, where said query comprises a query in a specific query language.

32. The system of claim 31, wherein said receiving a query includes receiving a query in SQL database query language.

33. The system of claim 30, where said providing data regarding said corresponding cases comprises providing data regarding each of said corresponding cases.

34. The system of claim 30, where said request comprises a request for a sample of data, and where said data regarding said corresponding cases comprises data regarding a sampling of said corresponding cases.

35. A system for providing information regarding a graphical representation of a mining model applied to a data set, said system comprising:

a user interface, said user interface (a) receiving as input a request for data underlying a specified node from a graphical representation of a mining model applied to a data set comprising at least one case, said graphical representation comprising at least one node corresponding to at least one of said at least one case, (b) sending a query comprising said data to retrieve, from among said at least one case, one or more corresponding cases which correspond to said specified node, and (c) responding to said request with data regarding said corresponding cases, the data being absent from the graphical representation of the mining model; and a database for storing said data set, operably connected with said user interface, and for receiving said query and returning said data regarding said corresponding cases to said application programming interface.

36. The system of claim 35, where said query comprises a query in a specific query language.

37. The system of claim 36, wherein said receiving a query includes receiving a query in SQL database query language.

38. The system of claim 35, where said providing data regarding said corresponding cases comprises providing data regarding each of said corresponding cases.

39. The system of claim 35, where said request comprises a request for a sample of data, and where said data regarding said corresponding cases comprises data regarding a sampling of said corresponding cases.

40. The system of claim 35, where said request for data underlying a specified node from a graphical representation of a mining model comprises an indication that a user has selected said node.

41. The system of claim 40, where said indication comprises a mouse click.

42. A system for providing information regarding a graphical representation of a mining model applied to a data set, said data set comprising at least one case, said graphical representation comprising at least one node corresponding to at least one of said at least one case, said system comprising:

request receipt means for receiving a request for data underlying a specified node from among said at least one node;

correspondence determination means for determining which of said at least one case corresponds to said specified node; and data provision means for providing data regarding said corresponding cases, the data being absent from the graphical representation of the mining model.

43. A method for providing information regarding a graphical representation of a mining model applied to a data set, said data set comprising at least one case, said graphical representation comprising at least one node corresponding to at least one of said at least one case, said method comprising:

receiving a request for data underlying a specified node from among said at least one node;

determining at least one hypothetical case corresponding to said specified node, the hypothetical case being absent from the graphical representation of the mining model; and providing data regarding said corresponding hypothetical cases.

44. The method of claim 43, where said receiving includes detecting a request for data underlying a specified node, said detecting comprising:

receiving a query having query information associated therewith; and detecting that said query information comprises said request for hypothetical data corresponding to a specified node.

45. The method of claim 44, where said receiving a query comprises receiving a query in a specific query language.

46. The method of claim 44, wherein said receiving a query includes receiving a query in SQL database query language.

47. A computer readable medium comprising computer executable modules having computer executable instructions for performing the method of claim 43.

48. A computer readable medium comprising computer executable modules having computer executable instructions, said modules for providing information regarding a graphical representation of a mining model applied to a data set, said data set comprising at least one case, said graphical representation comprising at least one node corresponding to at least one of said at least one case, said computer executable modules comprising:

an input component for receiving an indication of a node from among said at least one node;

an analysis component for determining at least one hypothetical case corresponding to said specified node, the hypothetical case being absent from the graphical representation of the mining model; and an output component that outputs data regarding said corresponding hypothetical cases.

49. The computer readable medium of claim 48, where said input component detects a request for hypothetical data underlying a specified node.

50. The computer readable medium of claim 49, where said input component receives a query and detects that said query includes said request for hypothetical data underlying a specified node.

51. A system for providing information regarding a graphical representation of a mining model applied to a data set, said data set comprising at least one case, said graphical representation comprising at least one node corresponding to at least one of said at least one case, said system comprising:

request receipt means for receiving a request for hypothetical data corresponding to a specified node from among said at least one node;

hypothetical case provision means for providing at least one hypothetical case corresponding to said specified node, the hypothetical case being absent from the graphical representation of the mining model; and data provision means for providing data regarding said corresponding hypothetical cases.

* * * * *